April 30, 1935.  R. E. BRIGGS  1,999,863
CONVEYER
Filed Oct. 30, 1931   2 Sheets-Sheet 1
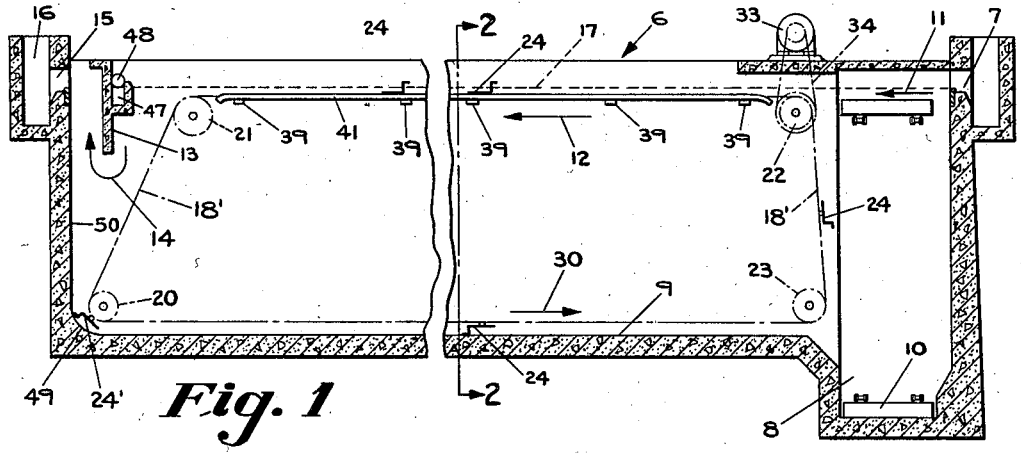
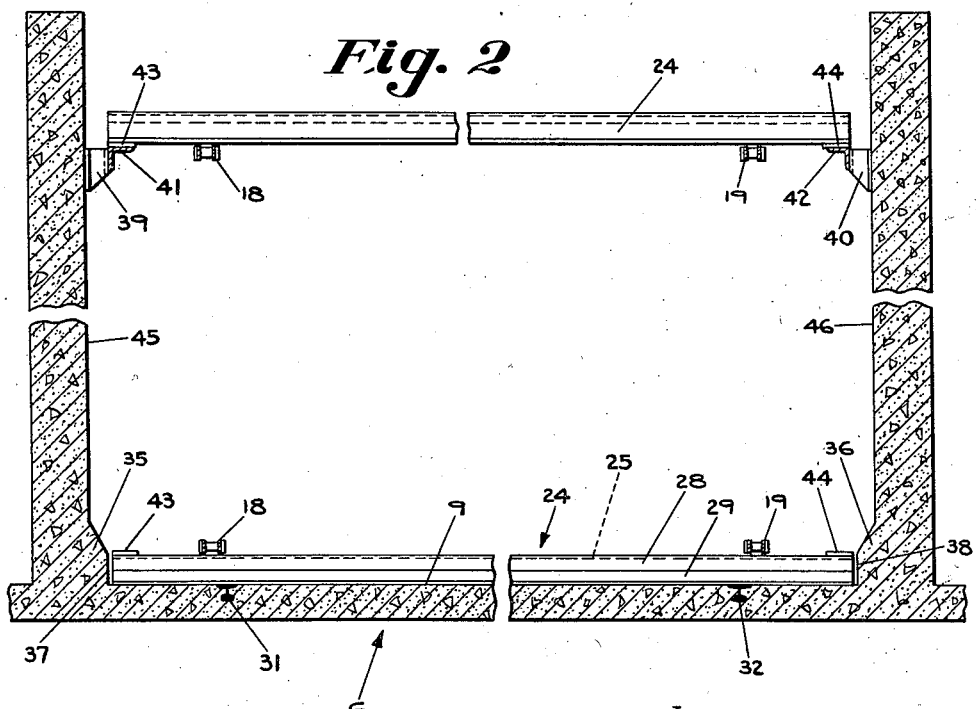
INVENTOR
Robert E. Briggs.
By Chas. M. Nissen,
ATT'Y.

April 30, 1935.                R. E. BRIGGS                1,999,863
                                CONVEYER
                          Filed Oct. 30, 1931              2 Sheets-Sheet 2

INVENTOR
Robert E. Briggs.
By Chas. M. Nissen,
ATT'Y.

Patented Apr. 30, 1935

1,999,863

UNITED STATES PATENT OFFICE 1,999,863

CONVEYER

Robert E. Briggs, Columbus, Ohio, assignor to The Jeffrey Manufacturing Company, Columbus, Ohio, a corporation of Ohio Application October 30, 1931, Serial No. 572,114

6 Claims. (Cl. 209—208)

My invention relates to apparatus for removing solids from liquids and one of its objects is to provide improved and efficient conveyer mechanism in apparatus of this type.

Another object of the invention is to provide improved mechanism for removing sediment from a rounded corner at the bottom of a sedimentation tank between a vertical wall and the bottom of the tank.

A further object of the invention is the provision of conveyer flights which are adapted to act as collectors, carriers, scrapers and pushers, in a sedimentation tank containing liquids with solids in suspension.

Another object of the invention is to provide improved conveyer flights which are adapted to act as scoops to remove sediment from the bottom of a sedimentation tank to a sump and also to transfer some floating material on the surface of the liquid in the tank to the bottom of the tank.

More particularly it is the object of the present invention to provide imperforate flights for traveling conveyers, each L-shaped in cross-section with one arm relatively long and acting as a collector and carrier and the other arm relatively short and acting as a scraper and pusher along the bottom of a sedimentation tank containing a liquid with solids in suspension therein.

Another object of the invention is to provide in the floor of a tank a plurality of spaced-apart metal rails inverted in position to expose the wider bottom surfaces flush with such floor to act as guiding means for the flights of a conveyer traveling along the bottom of the tank.

Other objects of the invention will appear hereinafter, the novel combinations and features being set forth in the appended claims.

In the accompanying drawings,

Fig. 1 is a longitudinal sectional elevation of apparatus adapted to remove solids from liquids and embodying my improvements;

Fig. 2 is a transverse sectional elevation of the structure shown in Fig. 1;

Figure 5:
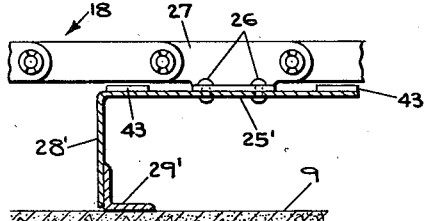
Fig. 5 is a sectional view of a modified flight comprising scooping means.

Referring to Fig. 1, 6 designates a sedimentation tank particularly adapted for use in sewage disposal apparatus although it should be understood that it may have a general application. An inlet port 7 is provided for the influent mixture of the liquid and solids. This inlet port is directly above the sump compartment 8 the bottom of which is located below the bottom 9 of the tank proper. Consequently the heaviest solids upon entering the influent port 7 will immediately settle into the sump 8 from which they may be removed by means of the endless traveling flight conveyer 10 in a well known manner.

The influent moves from port 7 in the direction of the arrow 11 and the flow continues slowly along the tank 6 as indicated by the arrow 12 until it strikes the baffle plate 13, which deflects the liquid downwardly as indicated by the arrow 14 for flow to the effluent port 15. Then the flow continues into the outlet trough 16. The normal level of the liquid is indicated by the dotted line 17, which is adjacent the upper edges of the walls of the sedimentation tank.

Mounted in the tank 6 is an endless traveling conveyer comprising two endless chains 18, 19 guided around the direction sprockets rotatable on fixed axes or stationary bearings as illustrated diagrammatically at 20, 21, 22 and 23 in Fig. 1. The path of travel of the chains is illustrated by the chain line 18'.

Figure 4:
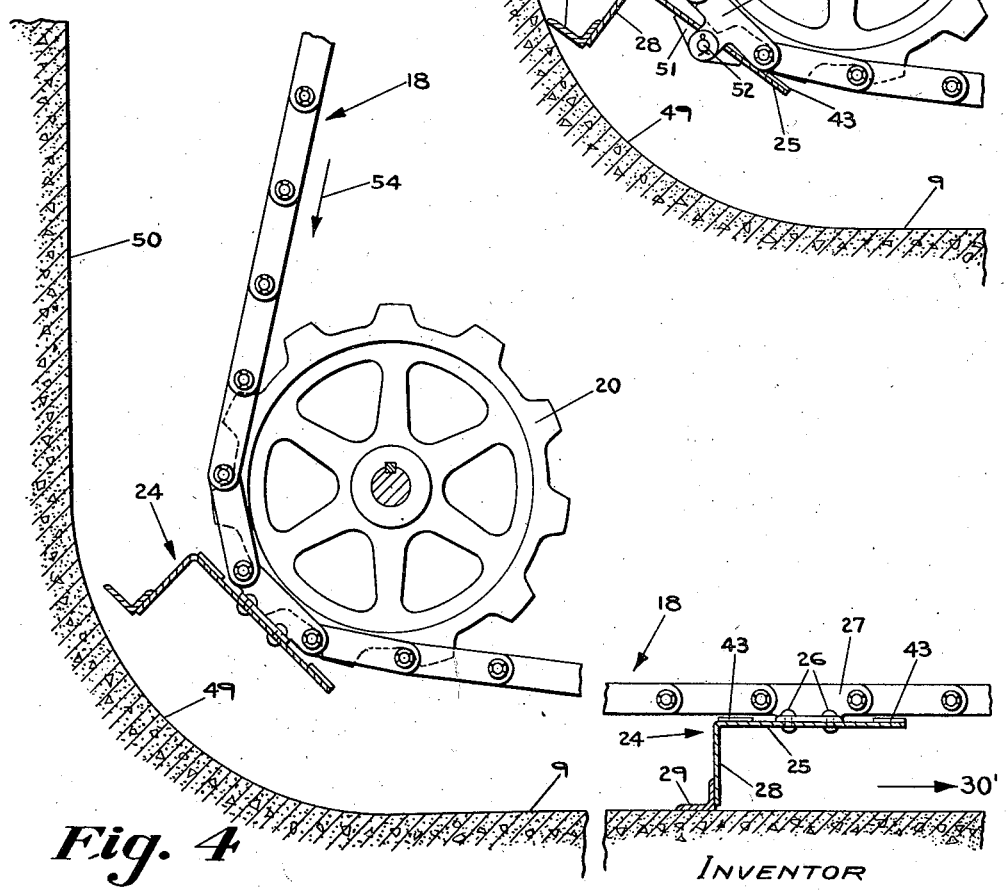
Fig. 4 is a view similar to Fig. 3 but showing the relation of the fixed flights to the rounded corner of the tank.

The transverse cross-flights 24 are each L-shaped in cross-section and each provided with a longitudinal arm 25 riveted at 26 to one of the links 27 as shown in Fig. 4. Each flight 24 is also provided with an arm 28 in a plane extending transversely of the chain 18 and at right angles to the relatively long arm 25. Secured to the lower end of the arm 28 is an angle bar 29 in position to contact with the floor 9 and move in the direction of the arrow 30 in Fig. 1 or in the direction of the arrow 30' in Fig. 4, to act as a scraper over the horizontal flat floor 9 of the tank 6.

The tank 6 is preferably constructed of concrete and before the same is poured for the construction of the bottom of the tank, rails 31 and 32 are mounted in inverted positions as shown in Fig. 2 with the bottoms of the rails or the undersides of the flanges thereof flush with the floor level 9. Or, the undersides of the rails may temporarily project above said floor 9 until the entire flight conveyer has been mounted in position as shown in Fig. 1 and then sufficient concrete may be filled in at the floor to enable movement of the flights longitudinally of the tank to scrape off the excess concrete to provide a surface flush with the bottom surfaces of the rails 31, 32. During subsequent operations of the conveyer apparatus in the treatment of sewage or other liquids laden with solids the wear due to contact of the shoes 29 with the floor 9 of the tank will be taken by the wide bottoms of the rails 31, 32. The floor 9 will thus be efficiently maintained at the desired level in the plane as determined by the exposed surfaces of the rails 31, 32.

A motor 33 is connected by means of a sprocket chain 34 to the conveyer apparatus comprising the two chains 18 and 19. Each chain is mounted on four sprocket wheels rotating on fixed axes or stationary bearings in submerged positions in the tank. While the sprockets guide the chains along desired paths of travel to a large extent when the runs are short, the flexibility of the chains permit some lateral movement when the runs are relatively long. I therefore prefer to confine the ends of flights 24 by filling in the concrete at the sides of the floor 9 as shown at 35, 36 to provide the guide walls 37, 38. In other words, a shallow trough is provided at the bottom of the tank for receiving and guiding the conveyer flights in their sediment removing movement in the direction of the arrow 30 toward the sump 8, the beveled surfaces of the guide walls serving to deflect settling sediment into the path of the conveyer flights.

At intervals along the upper portions of the inner side walls of the tank are mounted fixed brackets 39, 40 to which are secured longitudinal guide rails 41, 42 spaced from the adjacent inner walls of the tank. Wear strips 43, 44 at the inner sides of the ends of the flights 24 engage and ride over the longitudinal rails 41, 42 while the sprocket wheels 21, 22 keep the flights on the track comprising the rails at opposite sides of the tank walls. Since the walls 37, 38 of the flight trough are spaced inwardly from the walls 45, 46 of the tank the ends of the flights when traveling along the walls have ample clearance therefrom. The disturbance of the mixture in the tank is therefore reduced to a minimum.

The upper run moves in the direction of flow from a position near the influent port to a position near the effluent port. In sewage disposal apparatus the movement of the conveyer flights is very slow—for instance, one and one-half feet per minute and the flow of the mixture from the inlet port to the outlet port is at about the same rate. However, the operation of the conveyer may be intermittent so as to increase sedimentation during the periods of rest.

It should be particularly noted that the flights 24 of the conveyer are imperforate. When the flights move along the bottom 9 of the tank in the direction of the arrow 30 out of the main current of flow of the liquid in the tank, the relatively long arm 25 acts to collect the sediment at the floor 9 by preventing it from flowing over the top of the vertical arm 28. The shoe 29 scrapes the level bottom of the tank as it slides over the rails 31, 32. The vertical plate 28 acts to push the sediment forward in the direction of the arrow 30' of Fig. 4. This pushing action also serves to compress the sediment into a smaller space until the whole flight is filled with sediment after the excess liquid has been squeezed out.

The foregoing assumes that the layer of sediment is less than the height of the horizontal plate 25 above the floor 9. If the depth of the sediment is about the height of the plate 25 the latter will be filled with sediment after a short distance of travel of the flight 24. If the conveyer has been permitted to remain at rest during sedimentation so that the sediment buries the flights the arms 25 act not only as collectors but also as carriers and the entire mass of sediment may be moved into the sump 8 during a short period of operation of the conveyer.

On account of the confining and collecting action of the L-shaped flights they may be placed farther apart along the conveyer chains. When thus spaced farther apart more time may be allowed for sedimentation in a continuously operated system wherein the conveyers are traveling continuously or by using the same flight spacing as heretofore the conveyer may be operated more slowly thereby creating less disturbance in the liquid.

As shown in Fig. 1 when the flights move toward the effluent port they project from the surface of the liquid so that the rear sides of the vertical plates 28 act to push the floating solids toward the scum trough 47 from which they flow through the outlet port 48.

In the modification shown in Fig. 5 the angle bar 29' is secured to the front wall of the vertical plate 28' so as to be in position to act not only as a scraper along the bottom 9 of the tank but also as a scoop to gather the sediment at the floor. Evidently when this form is in its upside down or reversed position at the surface of the liquid in the tank the angle bar 29' coacts with the adjacent walls of the flight 25' to form a collector of the floating solids so as to confine them for movement to the bottom of the tank and intermixture with the sediment and finally into the sump 8 for removal by the conveyer 10.

Figure 3:
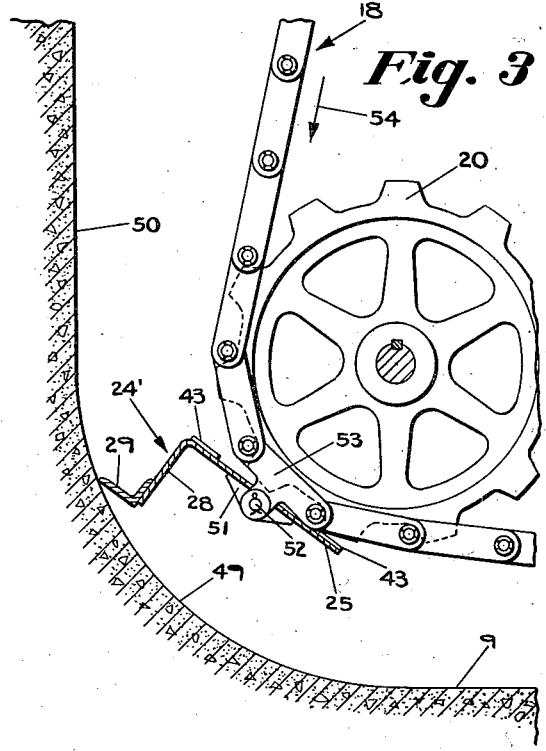
Fig. 3 is an enlarged elevational view, partly in section, of a portion of conveyer apparatus embodying a pivoted flight particularly adapted to remove sediment from a rounded corner of a sedimentation tank.

For the purpose of cleaning the rounded corner 49 between the floor 9 and the vertical wall 50 at the effluent end of the tank I provide two or more pivoted flights 24' one of which is illustrated in Fig. 3. Each of these flights is secured to rocking brackets 51 pivoted at 52 to T-shaped links 53. When the chains are driven in the direction of the arrows 54 the flights 24 which are fixed at 26 to links 27 clear the round corner 49 as shown in Fig. 4 but when the pivoted flights approach the round corner 49 each tilts on its pivot 52 until the shoe 29 is in contact with such round corner and acts to scrape the sediment downwardly while such scraped sediment remains under the imperforate plates 28, 25 as well as under the imperforate angle bar 29. Since the clearance at the ends of the flights is small as indicated at 37, 38 in Fig. 2, the material scraped from the rounded corner 49 will be kept confined until removed to the sump 8.

Obviously those skilled in the art may make various changes in the details and arrangement of parts without departing from the spirit and scope of the invention as defined by the claims hereto appended and I wish therefore not to be restricted to the precise construction herein disclosed.

Having thus described and shown an embodiment of my invention what I desire to have secured by Letters Patent of the United States is:—

1. In apparatus for separating solids from liquids, the combination with a tank, of guide rails, brackets secured to the inner opposite walls of said tank to support said rails adjacent said walls in elevated positions adjacent a predetermined level of liquid in the tank, an endless traveling conveyer comprising spaced-apart endless chains with cross-flights connected thereto in position to slide along said rails when moving along the surface of the liquid and along the bottom of the tank when acting on sediment, said flights each having a relatively long collector and carrying arm and a relatively short scraper and pusher arm, and means for guiding said chains to cause said flights to travel alternately along the bottom of the tank and along the surface of the liquid in the tank.

2. In conveyer apparatus, the combination with a tank having a concrete floor, of spaced-apart inverted rails of metal with the wider bottom portions of the rails exposed and flush with said floor, a scraper conveyer, and means for guiding said conveyer for movement along the exposed portions of said rails and over said floor.

3. In conveyer apparatus, the combination with traveling draft device, of a flight connected thereto to travel therewith, said flight being L-shaped in cross-section and comprising a collector arm parallel to the draft device and a scraper at right angles thereto, and a transverse bar angular in cross-section and connected to the lower edge and trailing side of said scraper.

4. In conveyer apparatus, the combination with a traveling draft device, of a flight connected thereto to travel therewith, said flight being L-shaped in cross-section and comprising a collector arm parallel to the draft device and a scraper at right angles thereto, and a transverse bar angular in cross-section with one leg horizontal and projecting forwardly from the lower edge of said scraper.

5. A conveyer comprising a flight having a collector and carrying arm relatively long and a scraper arm relatively short, and a scoop plate projecting forwardly from the lower edge of said scraper arm and short relatively thereto.

6. In apparatus for separating sediment from liquids, the combination with a sedimentation tank having a rounded corner at one end of its bottom, of a conveyer comprising a flexible carrier and scraper flights directly mounted on the carrier and directly connected therewith, the connections for certain of the flights being pivotal for maintaining the flight in continuous engagement with the rounded corner and bottom of the tank as the carrier moves through the tank, the connections for the remaining flights being rigid, all of the flights being adapted to scrape the bottom of the tank as the carrier moves therethrough, each of the flights comprising a horizontal forwardly projecting imperforate relatively long collector and carrying plate, a vertical pusher plate at the rear end of the horizontal plate and a scraper shoe having a rearwardly extending flange engaging the tank as the conveyer moves therethrough.

ROBERT E. BRIGGS.